United States Patent [19]
Smelser et al.

[11] Patent Number: 5,251,310
[45] Date of Patent: Oct. 5, 1993

[54] METHOD AND APPARATUS FOR EXCHANGING BLOCKS OF INFORMATION BETWEEN A CACHE MEMORY AND A MAIN MEMORY

[75] Inventors: Donald Smelser, Bolton; Nicholas A. Warchol, Boxborough; Gary Lidington, Wayland, all of Mass.

[73] Assignee: Digital Equipment Corporation, Maynard, Mass.

[21] Appl. No.: 546,572

[22] Filed: Jun. 29, 1990

[51] Int. Cl.⁵ .............................................. G06F 13/00
[52] U.S. Cl. ................................. 395/425; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,392,200 | 7/1983 | Arulpragasam et al. | 395/425 |
| 4,453,230 | 6/1984 | Mizoguchi et al. | 395/400 |
| 4,458,310 | 7/1984 | Chang | 395/425 |
| 4,622,631 | 11/1986 | Frank | 395/800 |
| 4,774,659 | 9/1988 | Smith et al. | 395/400 |
| 4,814,981 | 3/1989 | Rubinfeld | 395/425 |
| 4,858,111 | 8/1989 | Steps | 395/425 |
| 4,985,825 | 1/1991 | Webb, Jr. et al. | 395/400 |
| 4,995,041 | 2/1991 | Hetherington et al. | 395/575 |
| 5,019,965 | 5/1991 | Webb, Jr. et al. | 395/550 |
| 5,034,885 | 7/1991 | Matoba et al. | 395/425 |
| 5,043,874 | 8/1991 | Gagliardo et al. | 395/425 |
| 5,067,069 | 11/1991 | Fite et al. | 395/375 |
| 5,119,485 | 6/1992 | Ledbetter, Jr. et al. | 395/425 |
| 5,123,095 | 6/1992 | Papadopoulos et al. | 395/375 |

Primary Examiner—Joseph L. Dixon
Assistant Examiner—Reba I. Elmore
Attorney, Agent, or Firm—Cesari and McKenna

[57] ABSTRACT

A cache memory exchange protocol that utilizes an exchange memory access request is provided A cache controller issues the exchange request over a system bus to a main memory in response to a cache miss if the cache location is dirty. Upon receiving the request, the main memory decodes the request and fetches a block of information desired by the transfers a dirty cache block of information over the system bus and stores the dirty block in a temporary register located in the main memory. The block of information desired by the CPU is thereafter transferred by the main memory to the CPU via the system bus. The dirty cache block residing in the temporary register is then stored in the main memory storage elements.

8 Claims, 9 Drawing Sheets

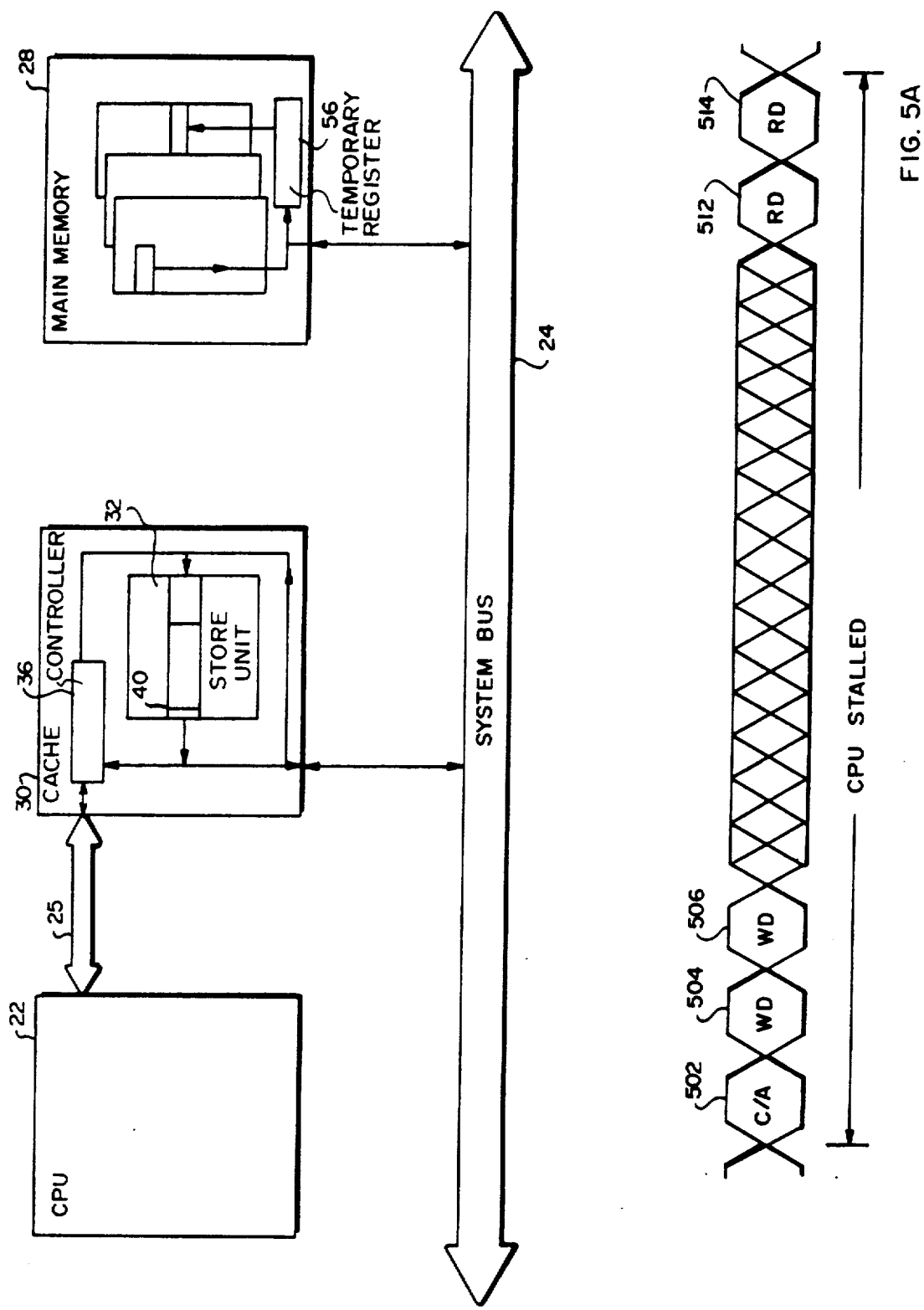

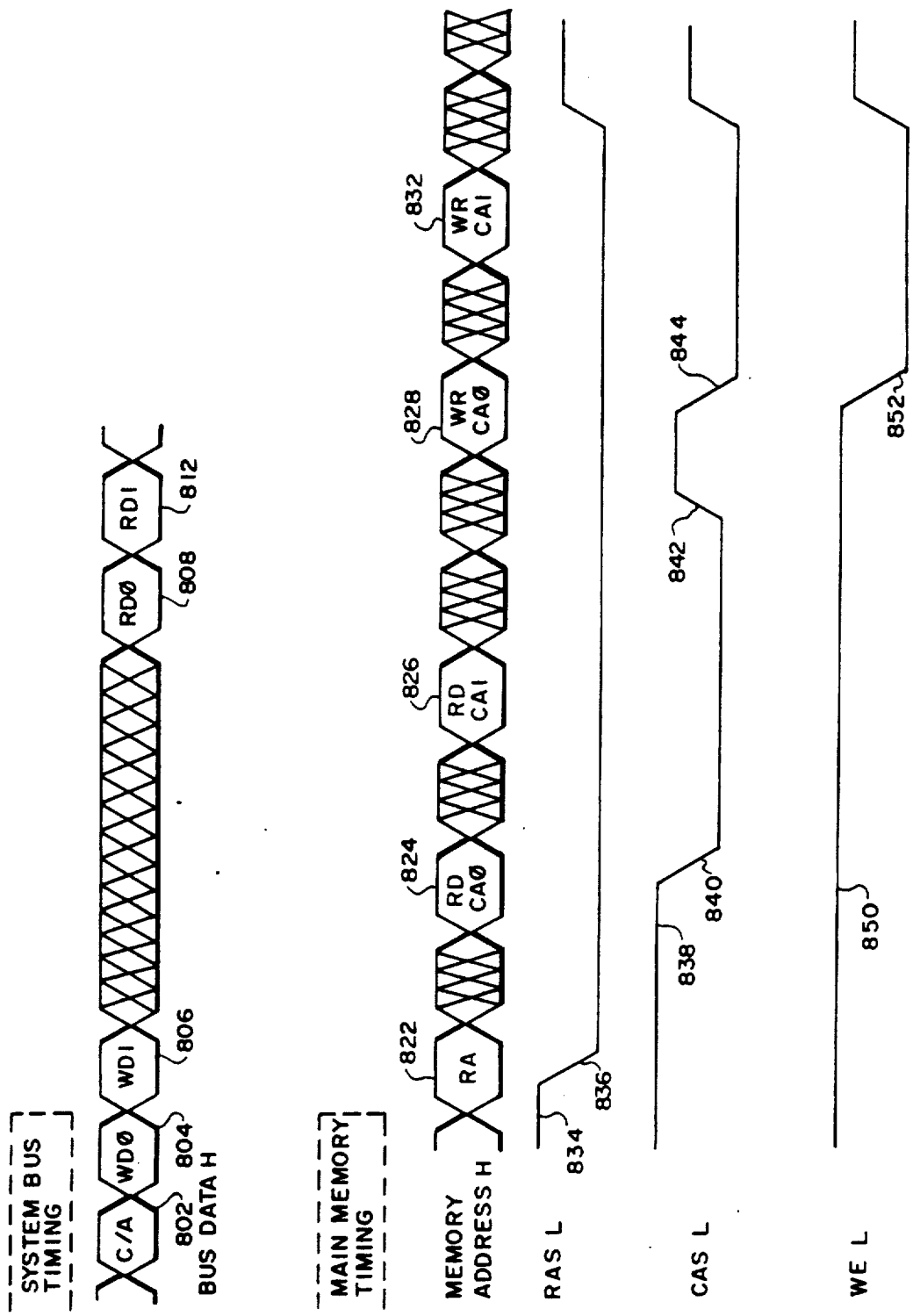

METHOD AND APPARATUS FOR EXCHANGING BLOCKS OF INFORMATION BETWEEN A CACHE MEMORY AND A MAIN MEMORY

FIELD OF THE INVENTION

The invention relates generally to digital data processing systems and, more specifically, to a method and apparatus for efficiently exchanging a block of data in a cache memory with another block of data in a main memory.

BACKGROUND OF THE INVENTION

A typical digital data processing system comprises a number of basic units including a central processing unit (CPU), a memory unit (main memory), and an input/-out (I/0) unit. The main memory stores information, i.e. data and instructions for processing the data, in addressable storage locations. The information is transferred between the main memory and the CPU along a bus consisting of control lines, address lines and data lines. Control signals specify the direction of transfer. For example, the CPU issues a read request signal to transfer data and instructions over the bus from an addressed location in the main memory to the CPU. The CPU then processes the retrieved data in accordance with the instructions obtained from the memory. The CPU thereafter issues a write request signal to store the results in an addressed location in the main memory.

The information transferred between the CPU and main memory must conform to certain timing relationships between the request signals and the information on the bus. Access time is defined as the time interval between the instant at which the main memory receives a request signal from the CPU and the instant at which the information is available for use by the CPU. If the CPU operates at a fast rate and the access time of the main memory is slow as compared to the CPU rate, the CPU must enter a wait state until the request to memory is completed, thereby adversely affecting the processing rate of the CPU. This problem is particularly critical when the memory request is a read request, since the CPU is unable to operate, that is, process data, without the requested information.

A high-speed cache memory is used in these situations. The cache memory access speed is closer to the operational speed of the CPU and thus, use of the cache memory increases the speed of data processing by providing information to the CPU at a rapid rate. The cache memory operates in accordance with the "principle of locality"; that is, if a memory location is addressed by the CPU, it will probably be addressed again soon and nearby memory locations also will tend to be addressed soon. When the CPU requires information, the cache memory is examined first. If the information is not located in the cache, the main memory is accessed. A "block mode" read request is then issued by the CPU to transfer a block of information including both the required information and information from nearby memory locations, from the main memory to the cache memory.

Typically, a random access main memory is logically organized as a matrix of storage locations, the address of each location thus comprising a first set of bits identifying the row of the location and a second set of bits identifying the column. Large memories may further be organized in boards and banks of boards. Thus, an address in such a memory may comprise fields identifying banks, boards and, within each board, rows and columns.

A cache memory is faster than main memory and, because of its higher cost, smaller. A cache memory holds a number of blocks of information, with each block containing information from one or more contiguous main memory locations. Each block is identified by a cache address. The cache address includes memory address bits that identify the corresponding memory locations. These bits are collectively called the "index" field. In addition to information from main memory, each block also contains the remainder of the memory address bits identifying the specific location in main memory from which the information in the cache block was obtained. These latter bits are collectively called a "tag" field. When the CPU requires information, the index field and tag field in the cache are examined to determine whether a block contains the requested information.

When the address in the cache does not match the address in the main memory specified by the CPU (i.e., a "cache miss") and the information presently stored in the addressed cache location has previously been changed from the information stored in the corresponding location in main memory (i.e., the cache block is "dirty"), the CPU issues a write request to transfer the cache block to main memory before issuing a read request to acquire a new block of information from the main memory. That is, the dirty cache block is written back to main memory to make room in the cache for the information that the CPU is currently requesting. If the write request is performed first then the performance of the CPU will suffer since it is stalled waiting for the required information.

Previously, a method or protocol for exchanging a block of information in a cache memory with another block of information in a main memory involved the CPU issuing a read request to the main memory, transferring the dirty block from cache memory to a temporary holding register, transferring the new block of information from the main memory when available to the cache memory over the system bus, then issuing a write request to main memory to store the contents of the temporary register in main memory. Such a complex protocol increases the time required per unit of information transferred over the system bus, i.e. decreases system bus bandwidth, since two requests are required to exchange the blocks of information.

Therefore, an object of the present invention is to provide a simplified protocol that increases system bus bandwidth when exchanging blocks of information between a cache and main memory, thereby increasing overall data processing system throughput.

Additionally, a feature of the present invention is to provide a cache memory exchange protocol that reduces CPU access time or latency for information obtained from main memory during an exchange between a block of information in a cache memory and a block of information in a main memory.

In accordance with another aspect of the invention, a feature is to provide an exchange request command that reduces the time required by the main memory to both retrieve a block of information designated by the CPU and store a dirty cache block of information.

SUMMARY OF THE INVENTION

The foregoing and other features of the invention are accomplished by providing a novel cache memory exchange protocol for efficiently exchanging a block of information in a cache memory with another block of information in a main memory. The cache memory exchange protocol increases overall system bus bandwidth and reduces CPU latency to needed information, thus increasing the throughput of the data processing system.

In accordance with the invention, the cache memory exchange protocol utilizes a memory access request called an "exchange" request. The exchange request includes a command field, an index field, a first tag field and a second tag field. In general, a cache controller issues the exchange request over a system bus to a main memory in response to a cache miss if the cache block to be replaced is dirty. Upon receiving the request, the main memory decodes the command field and immediately begins fetching a block of information requested by the CPU from a location identified by the index field and the second tag field. While the main memory is fetching, the controller transfers the block of information stored in the cache at a location defined by the index field and the first tag field of the exchange request over the system bus and to a temporary register located in the main memory.

Once fetched, the block of information requested by the CPU is transferred by the main memory to the CPU and is stored in the cache memory at the location identified by the index field and the second tag field. The block of information residing in the temporary register is then stored in the main memory at the location identified by the index field and first tag field. This is an internal memory operation that does not involve the CPU or system bus.

An advantage of this protocol is a significant increase in system bus bandwidth, since only one request is issued over the system bus to both retrieve a new block of information from main memory and transfer a dirty block of cache information to main memory.

In another aspect of the invention, the exchange request reduces the time required by the main memory to fetch a block of information requested by the CPU and store a dirty block of information from the cache. The cache is organized such that an index location used to select a block of information therein points to a corresponding row address location in main memory. The index field of the exchange request corresponds to this location, that is, the index field contains all the row address bits.

One of the tag fields of the exchange request contains the remaining address bits corresponding to a location in main memory where the new block of information requested by the CPU is to be fetched. The other tag field is equivalent to the tag of the dirty cache block and contains the remaining address bits corresponding to a location in memory where the dirty block is to be stored.

The main memory performs internal page mode read and write operations to reduce the amount of time it needs to fetch and store information in accordance with the exchange request. The main memory saves time and reduces bandwidth by maintaining a common index field as the row address throughout the execution of the exchange request.

Other objects, features, and advantages of the invention will become apparent from a reading of the specification when taken in conjunction with the drawings in which like reference numerals refer to like elements in the several views.

BRIEF DESCRIPTION OF THE DRAWINGS

FIG. 5A is a diagram of the timing interval associated with the cache memory exchange protocol according to the invention;

FIG. 8 is a timing diagram showing the relationship and interaction of signals used in accordance with the invention.

DETAILED DESCRIPTION OF ILLUSTRATIVE EMBODIMENTS

Figure 1:
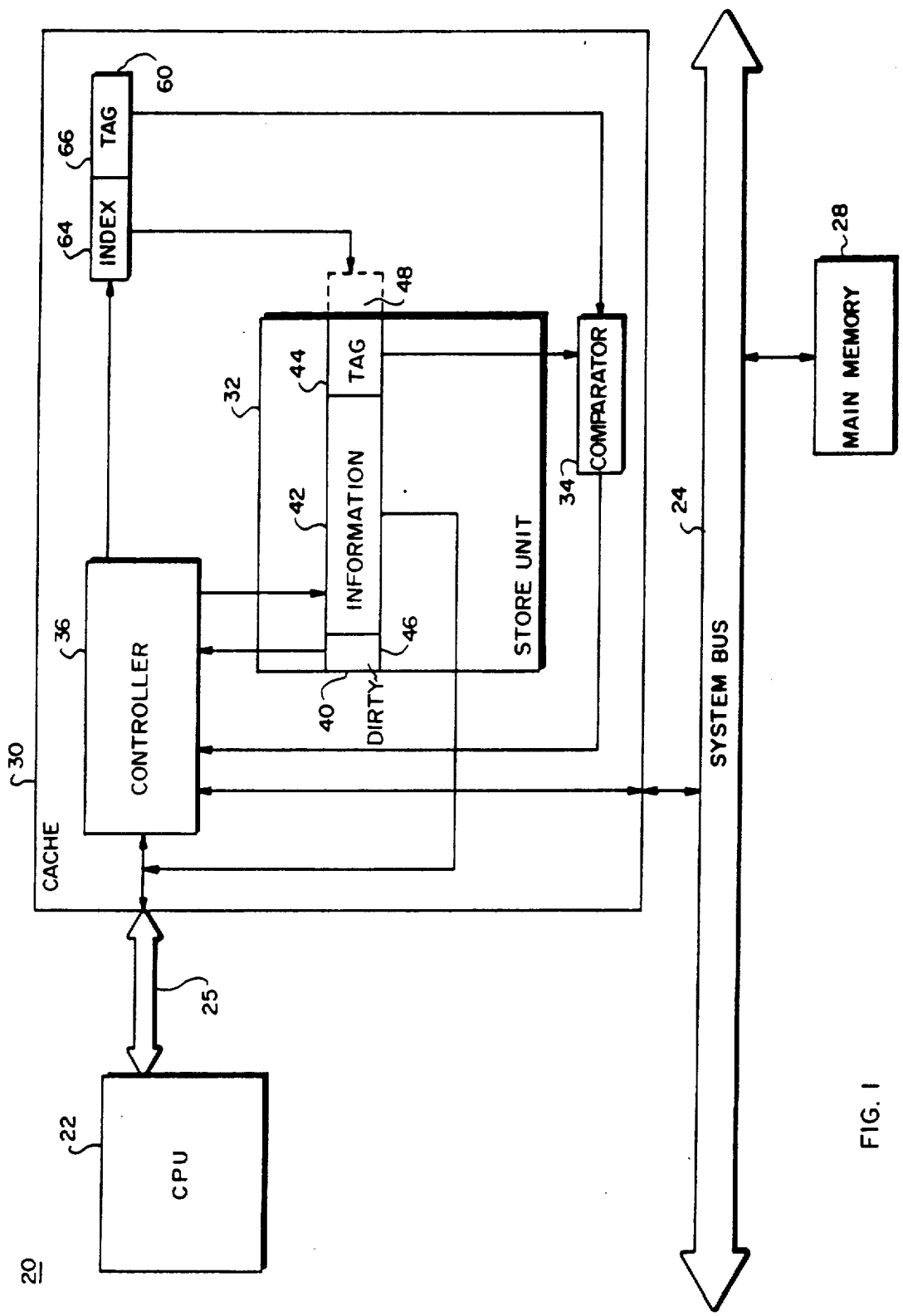
FIG. 1 is a block diagram of a data processing system for implementing a cache memory exchange protocol according to the invention.

Referring now to the drawings and particularly to FIG. 1, portions of a data processing system 20 relevant to the invention include a CPU 22, a cache memory 30 and a main memory 28. A system bus 24 having data, address and control lines couples the cache memory 30 to the main memory 28, and provides a communication path for the transfer of information to and from the cache 30 and main memory 28. Since the operational speed of CPU 22 is greater than the information access speed of main memory 28, CPU 22 usually obtains data and instructions from the cache memory 30 over a "private" CPU bus 25.

Cache memory 30 is a small, high-speed memory that temporarily stores most-recently-used information. Cache memory 30 is designed to reduce the number of address comparisons required to access the stored information, while also reducing the number of write requests to main memory 28 when the requested information is present in the cache 30. Accordingly, the cache memory 30 is preferably organized as a write-back, direct-mapped cache, although it will be apparent to those skilled in the art that other cache organizations, such as a set-associative cache, could be used within the teachings of the invention.

The cache memory 30 includes a store unit 32, a comparator 34 and a cache controller 36. The store unit 32 is divided into a plurality of blocks 40 that are configured to store a predetermined amount of information. Each block 40 includes an information portion 42, a tag portion 44 and a "dirty bit" portion 46. The information portion 42 contains the actual data and instructions processed by the CPU 22. The tag portion 44 contains lower order address bits used by the CPU 22 to identify particular memory locations of needed data and instructions. The dirty bit portion 46 contains a status bit that indicates whether the block 40 was modified while in the cache 30. Since the cache memory 30 is preferably organized as a direct-mapped cache, each block 40 has only one location where it can be contained in the store unit 32, with that unique location being identified by an index location 48.

Comparator 34 compares an address issued by CPU 22 with the tag portion 44 located in store unit 32 to determine whether the information desired by CPU 22 is located in cache 30. The controller 36 controls the internal operations of the cache memory 30 including issuing requests to main memory 28 to transfer information between the cache 30 and main memory 28 when needed.

Since the cache memory 30 operates in accordance with the principle of locality, when the CPU 22 requires information, the cache 30 is first examined. The CPU 22 sends an address, referred to hereafter as the CPU address 60, to the cache controller 36. The CPU address 60 has two fields: an index field 64 and a tag field 66. The index field 64 and tag field 66 correspond to the location in main memory 28 from which the information stored in cache 30 was retrieved; that is, the index field 64 corresponds to a row address portion of the main memory location, while the tag field 66 corresponds to a column address portion of the memory location.

The index field 64 of the CPU address 60 is used to select the location of the block 40 in store unit 32 requested by CPU 22. Once located, the tag portion 44 of block 40 and the tag field 66 are presented to comparator 34 to determine whether the tags match.

If the address tags match (i.e. a "cache hit"), the information located in the information portion 42 of block 40 is sent to the CPU 22. If the tags do not match, the dirty bit portion 46 of block 40 is examined by the controller 36. If set, the dirty bit 46 indicates that the information presently stored in the block 40 is "dirty", that is, it has been changed subsequently to its retrieval from the corresponding location in main memory 28. The information in the latter location is thus invalid, i.e. obsolete. Therefore, the cache controller 36 issues a write request to transfer the block 40 to main memory 28 before issuing a read request to acquire a new block of information from the main memory 28.

Figure 2:
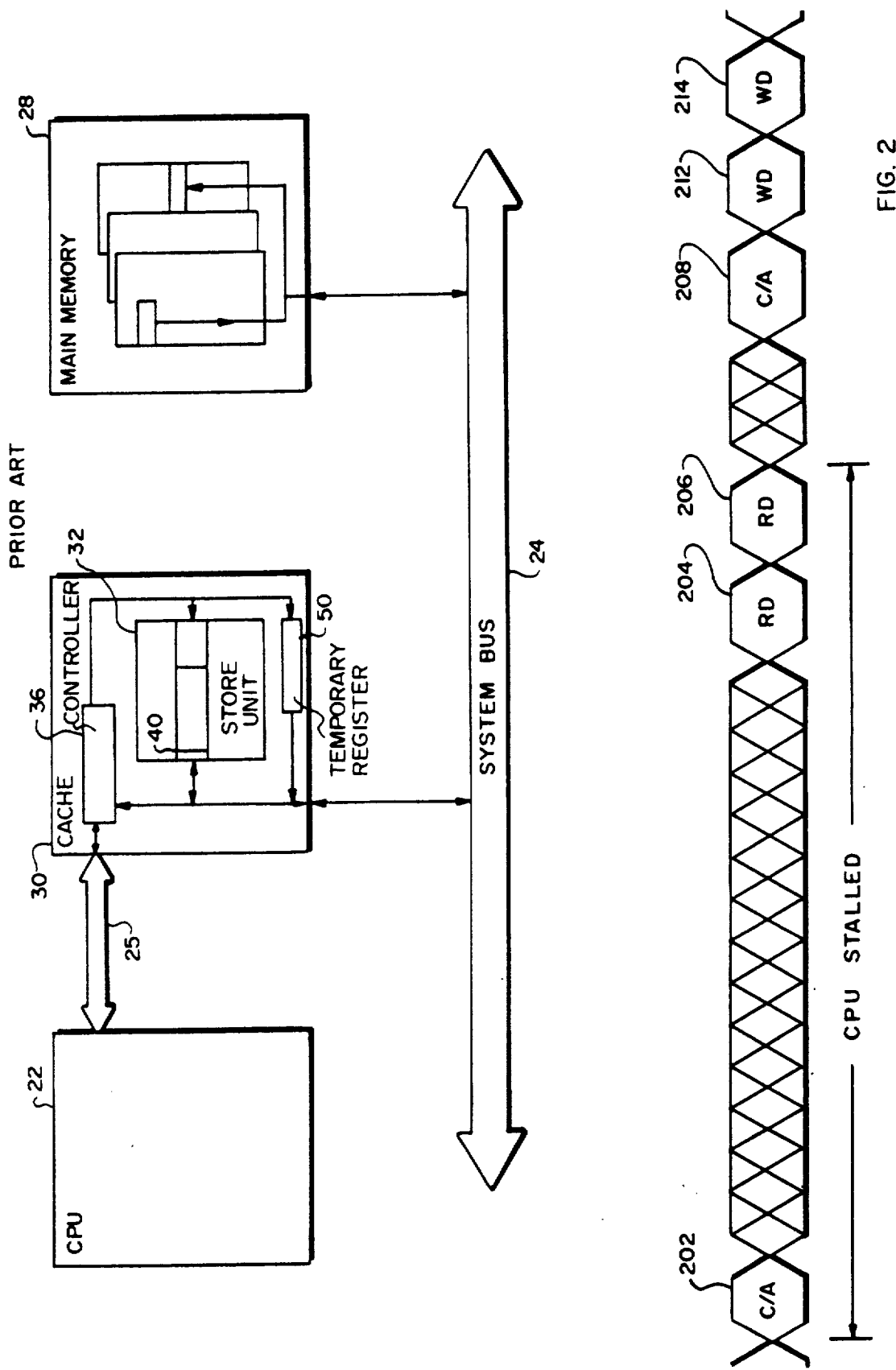
FIGS. 2 and 3 are diagrams of timing intervals associated with prior art implementations of write-back cache protocols.

FIG. 2 illustrates a timing interval over system bus 24 of a prior art implementation used to exchange a dirty block of information in a write-back cache memory with a requested block of information in a main memory by a CPU. According to this particular protocol, cache controller 36 issues a read request (C/A 202) to the main memory 28 for the requested information and transfers the dirty block 40 from the store unit 32 to a temporary holding register 50 in the cache 30. A predetermined time later, the main memory 28 returns the requested information to the cache memory 30 and CPU 22 in two separate transfers (RD 204 and RD 206) over system bus 24. The controller 36 then issues a write request (C/A 208) to transfer the dirty block 40 (WD 212 and WD 214) to main memory 28.

It is to be understood that the number of transfers required to move information to and from the cache 30 and main memory 28 over system bus 24 is a design choice dependent upon factors such as the size of a cache block, the structure of the system bus data path, etc. Accordingly, two separate transfers are used herein and in connection with other described embodiments for ease of depiction and ease of description. Nevertheless, the information transferred between the cache 30 and main memory 28 could be accomplished in one system bus 24 transfer.

In the block exchange of FIG. 2, CPU latency while waiting for the requested information is reduced to as low a level as possible, since the new information is returned as soon as possible after the initiation of the exchange with main memory 28. However, two (2) memory access requests are needed to fetch the new block of information and store the dirty cache block 40 in main memory 28. Each one of these requests contribute to a decrease in system bus bandwidth.

Figure 3:
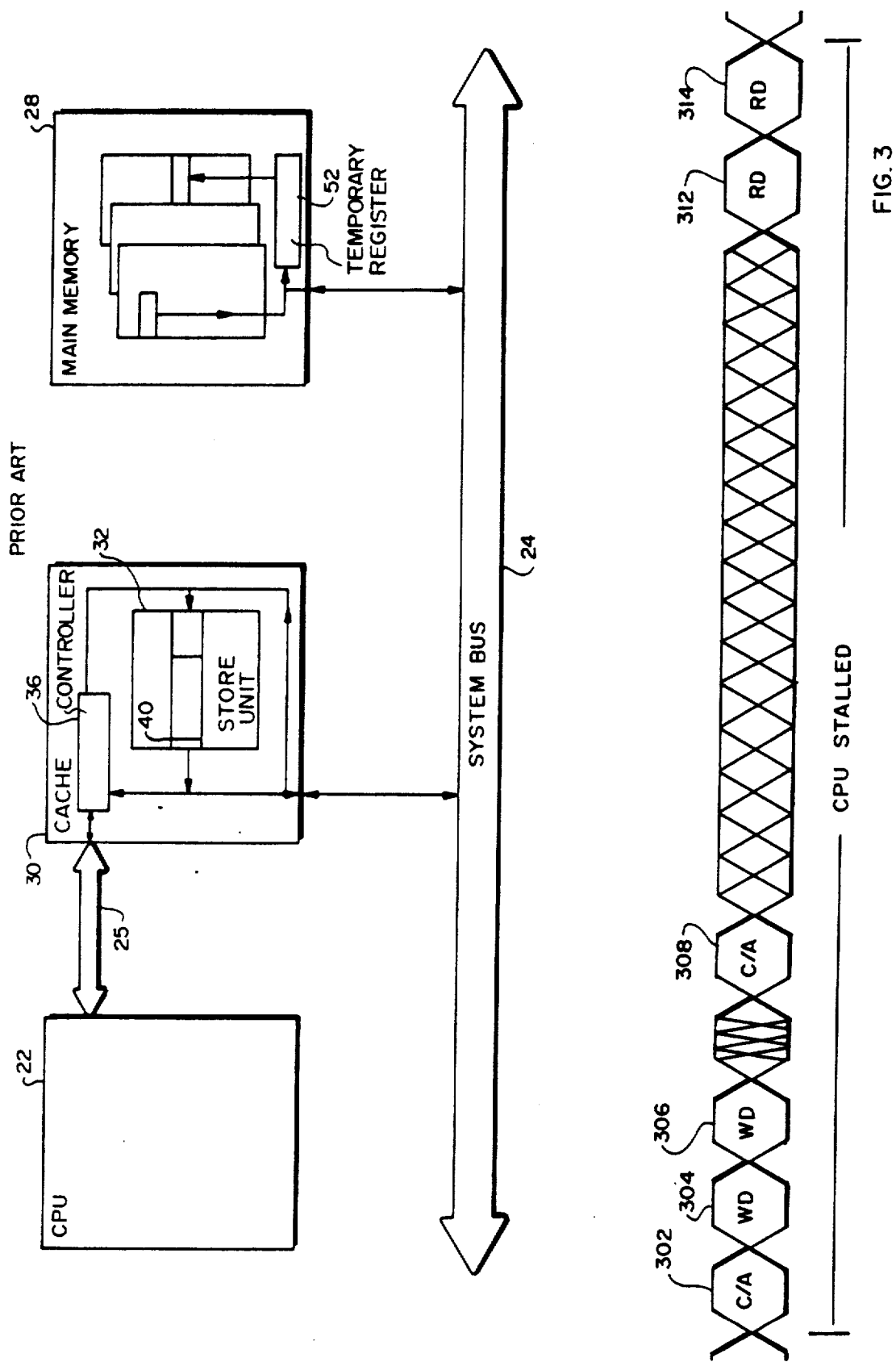

FIG. 3 illustrates a timing interval across system bus 28 of another prior art implemention of a write-back cache protocol. According to this protocol, controller 36 first issues a write request (C/A 302) to store the dirty cache block 40 in main memory 28 in two separate transfers (WD 304 and WD 306) over system bus 24. The dirty block 40 is loaded into a temporary register 52 in the main memory 28. Controller 36 then issues a read request (C/A 308) to obtain the desired information from main memory 28. Once the information (RD 312 and RD 314) is returned to CPU 30 and controller 36 over system bus 24, main memory 28 stores the contents of the temporary register 52 in the appropriate memory location.

The block exchange of FIG. 3 requires two (2) memory access requests over system bus 24 to complete. In addition, this protocol increases CPU latency for the requested information since it is not returned until after initiation and completion of the write request.

Figure 4:
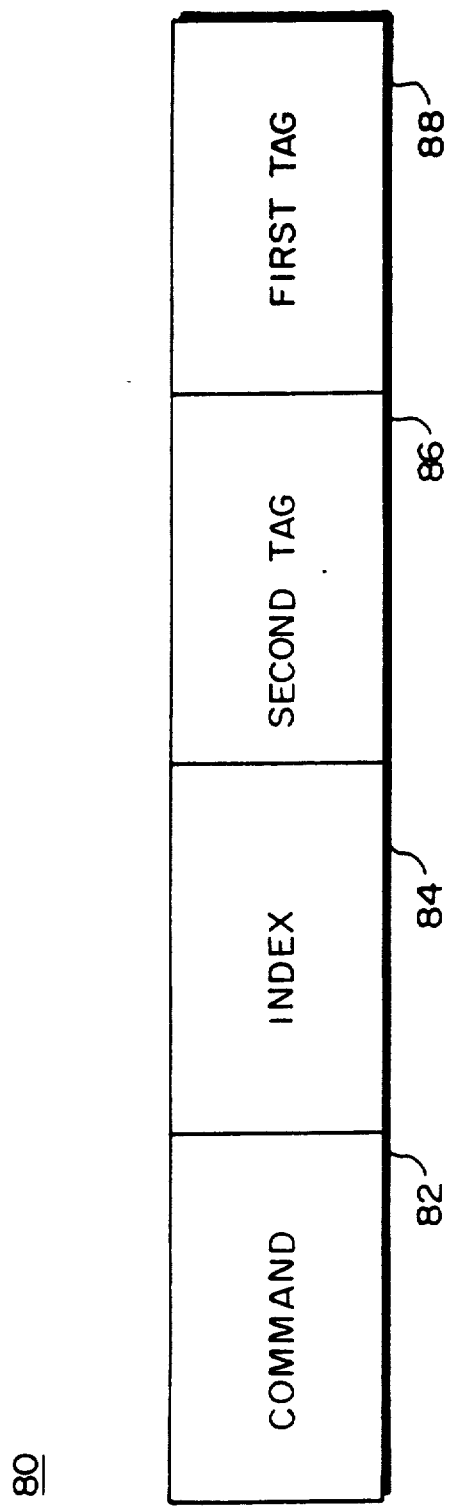
FIG. 4 is a diagram illustrating the format of an exchange request according to the invention.

In accordance with the present invention, the cache memory exchange protocol utilizes a unique memory access request called an "exchange" request that contributes to a reduction in CPU latency. FIG. 4 illustrates the format of this exchange request 80. The exchange request 80 includes a command field 82, an index field 84, a first tag field 88 and a second tag field 86. The command field 82 contains bits which identify the exchange request 80 as comprising two (2) operations: a read operation to fetch a new block of information from main memory 28 at a location identified by the index field 84 and the second tag field 86, and a write operation to store a dirty block of cache memory information in a location in main memory 28 identified by the index field 84 and first tag field 88.

The exchange request 80 takes advantage of the fact that the dirty block 40 in cache memory 30 and the requested block of information in main memory 28 share a common index field 84. As mentioned, the index field 64 of CPU address 60 corresponds to a row address location in main memory 28. The cache memory 30 is organized in a manner such that the index field 64 is used to select the appropriate cache block 40 identified by index location 48. Therefore, the index location 48 in cache 30 will point to a row address location in main memory 28. The exchange request 80 exploits this relationship to combine what are actually two separate memory access requests into one request using a common index field 84. The common index field 84 contains all the address bits corresponding to the row address location in main memory 28.

In accordance with the convention established for the exchange request 80, the second tag field 86 is equivalent to the tag field 66 of CPU address 60 and contains the remaining address bits corresponding to the location in main memory 28 where the new block of information requested by the CPU 22 is to be fetched. Similarly, the first tag field 88 is equivalent to the tag portion 44 of dirty cache block 40 and contains the remaining address bits corresponding to the location in memory 28 where the dirty block of information is to be stored. Column address bits, bank-select bits and board-select bits needed by the main memory 28 to perform the read and write operations of the exchange request 80 may be provided by the first and second tag fields 88 and 86, or a combination of the tag fields 88 and 86 and the index field 84. In any event, the same row address bits are used for the read and write operations of the exchange request 80.

Figure 5B:
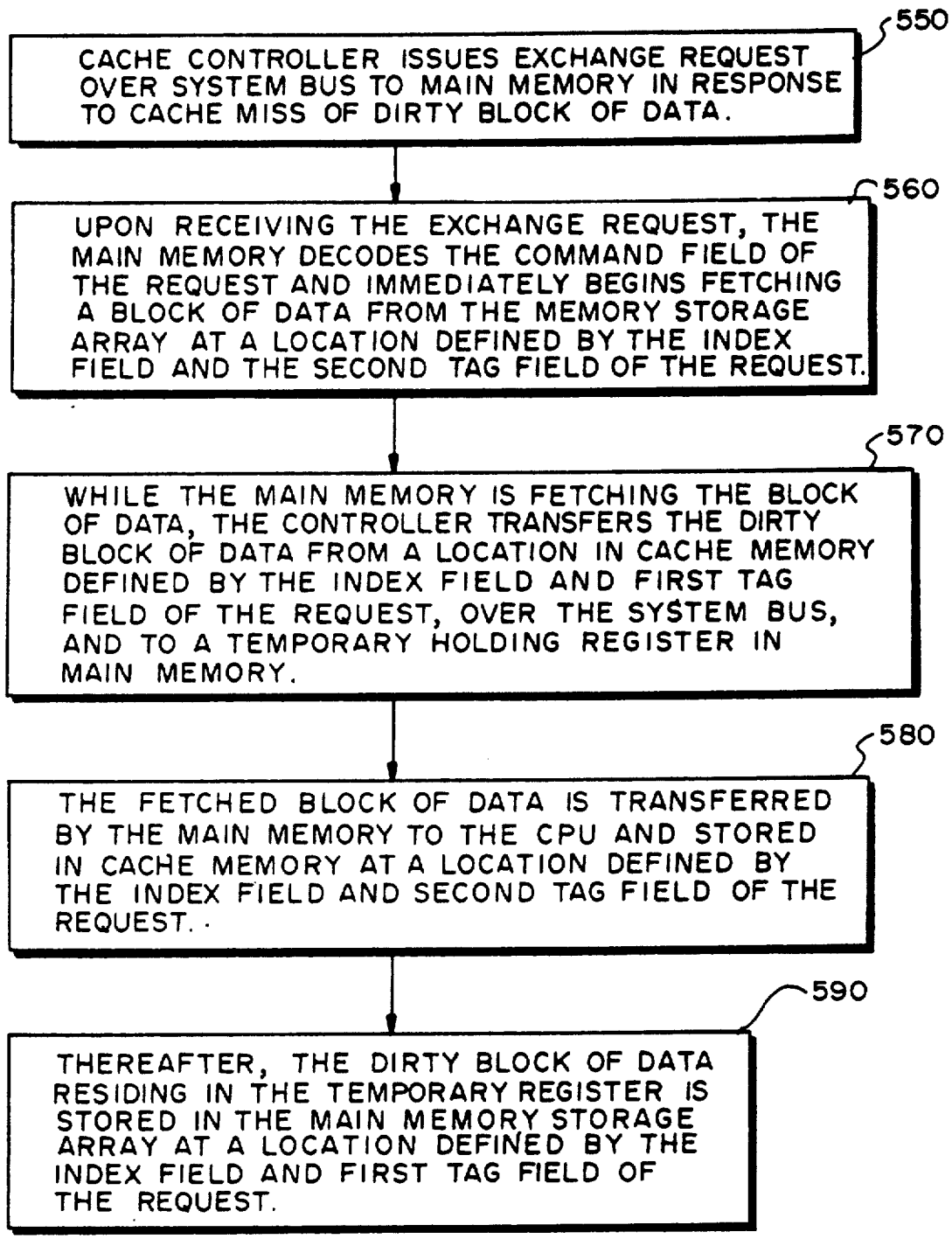
FIG. 5B is a flowchart detailing the steps of the exchange protocol according to the invention.

FIG. 5A depicts the timing interval over system bus 24 for the cache memory exchange protocol according to the invention and FIG. 5B is a flowchart detailing the steps of the protocol. Here, the cache controller 36 issues the exchange request 80 (C'/A' 502) over system bus 24 to main memory 28 in response, to a cache miss if the cache block to be replaced is dirty. (Step 550 of FIG. 5B.) Upon receiving the request 80, the main memory 28 decodes the command field 82 and immediately begins fetching a block of information at a location defined by the index field 84 and the second tag field 86. (Step 560.) While the main memory 28 is fetching the desired block of information, controller 36 transfers the dirty block 40 of information (WD 504 and WD 506) from the cache memory 30 location identified by the index field 84 and the first tag field 88 of the exchange request 80 over the system bus 28 and to a temporary register 56 located in the main memory 28. (Step 570.)

Once fetched, the new block of information is transferred in two separate transfers RD 512 and RD 514 by the main memory 28 to CPU 22 and also into the cache memory 30 at a location identified by the index field 84 and the second tag field 86. (Step 580.) The block of information residing in the temporary register 56 is then stored in the main memory 28 storage array at a location identified by the index field 84 and first tag field 88, i.e. the location from which the information was originally obtained by the CPU 22. (Step 590.)

The block exchange according to the invention increases system bus bandwidth and data processing system throughput. Only one (1)) memory access request is issued, resulting in fewer system bus cycles than prior write-back cache memory arrangements, while CPU latency resulting from the exchange transfers is reduced from that of prior arrangements.

In accordance with another aspect of the present invention, the cache memory exchange protocol reduces the time required by the main memory 28 to execute (i) the portion of the exchange request associated with fetching (read operation) the information requested by CPU 22 and (ii) the portion of the exchange request associated with storing (write operation) the dirty cache block of information. The exchange request 80 (FIG. 4), including the exchange command and address fields, is transferred in one (1)) cycle over the system bus 24. The exchange request address fields 84, 86 and 88 may indicate that the read and write operations will take place in the same memory module, or that the read operation will occur in one module and the write operation in another. If the exchange request address fields 82, 84 and 86 indicate that the read and write operations will occur in the same memory module, there is a possibility that the operations may occur within the same bank of memory devices.

Figure 6:
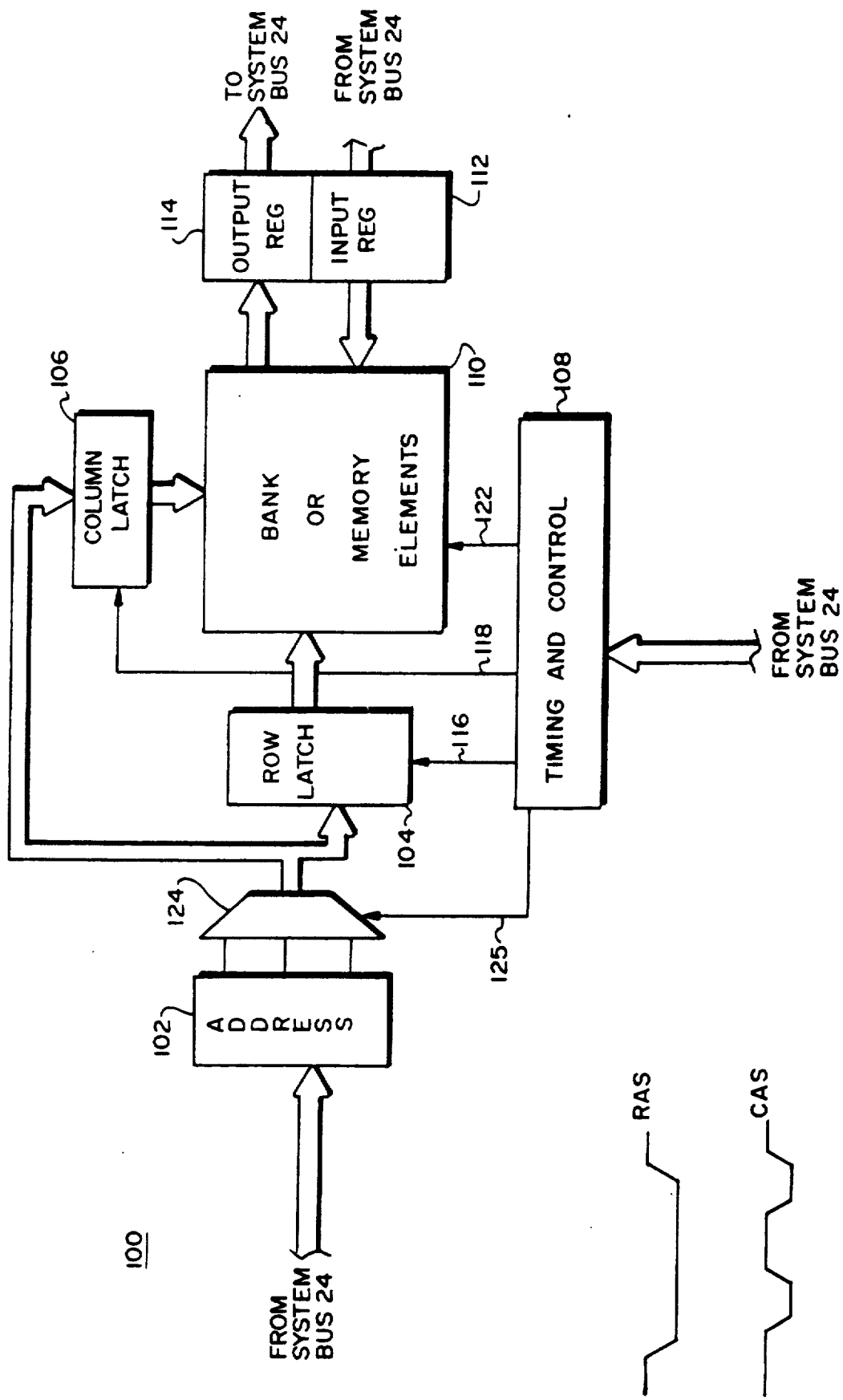
FIG. 6 is a block diagram of an embodiment of a main memory used in the data processing system of FIG. 1.

FIG. 6 depicts an embodiment of the internal organization of main memory used in data processing system 20. Here the fields of the exchange request 80 indicate that the read and write operations of the request are directed to the same memory bank 110 within a memory module 100. The row address for a typical memory access request is derived from the contents of index field 84 of the exchange request 80, while the column address is derived from the remaining contents of the index field 84 and the contents of tag fields 86 and 88.

According to the principles of the invention, the command field 82 of the exchange request 80 is presented to the timing and control unit 108 of main memory 28. The memory 28 first initiates a page mode read cycle to fetch the requested information from the memory location identified by the index field 84 and second tag field 86. For example, the index field 84, the first tag field 88 and the second tag field 86 are loaded into the memory address register 102 from the system bus 24. A multiplexer 124 selects the appropriate row address bits from the index field 84 when enabled by the timing and control unit 108 over line 125. The row address is loaded into a row latch 104 when a row address strobe (RAS) signal over line 116 is asserted.

Multiplexer 124 then selects the appropriate column address bits from the index field 84 and second tag field 86 when enabled over line 125. The column address is loaded into a column latch 106 when a column address strobe (CAS) signal over line 118 is asserted. The unasserted write enable (WE) signal provided by the timing and control unit 108 over line 122 then indicates that the access is a read operation. The requested information is then loaded from the memory storage elements into an output register 114 for transfer to system bus 24. At this time, the CAS signal is deasserted.

Since the index field 84 of the exchange request 80 is common for both the read and write portions of the block exchange, the main memory 28 then initiates a page mode write cycle to write the dirty cache block 40 into a location identified by the index field 84 and first tag field 88. The multiplexer 124 selects the appropriate column address bits when enabled by the timing and control unit 108 over line 125. With no change in the contents of the row latch 104, the WE signal is asserted over line 122 to indicate a write access and the column address is loaded into column latch 106 when the CAS signal over line 118 is asserted. In other words, the row latch 104 still contains the common row address bits and the RAS signal is still asserted. The appropriate memory elements in bank 110 are then accessed and the dirty block of information stored in input register 112 is transferred to the memory elements.

By maintaining a common row address throughout the execution of the exchange request, the preferred page mode read and write cycles reduce the time that the main memory 28 needs to perform the read and write operations of the exchange request 80. That is, prior to activating the RAS signal, a stable row address must be presented to satisfy the setup time requirements of the latch 104. The row address must be maintained over the input lines to the memory devices even after the RAS signal is activated in order to satisfy address hold time requirements. If different row addresses were required for the read and write operations, the RAS signal on line 116 would have to be deasserted in the interim for a significant minimum time interval, because of the characteristics of the storage elements, before assertion of a new address. The elimination of such time restrictions increases the overall bandwidth of main memory 28 and reduces the latency of a subsequent (read) operation to the same memory module.

Figure 7:
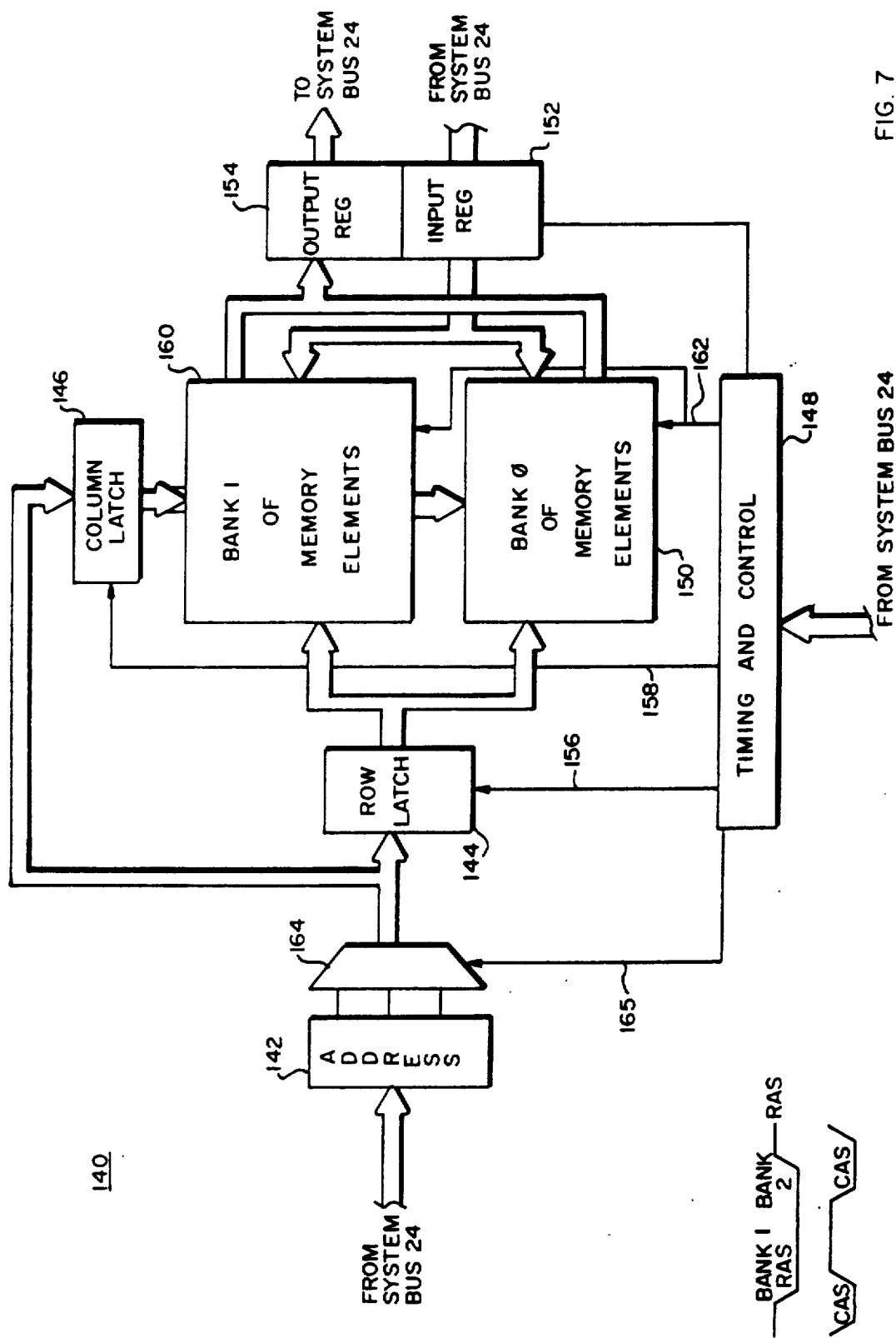
FIG. 7 is a block diagram of another embodiment of the main memory used in the data processing system of FIG. 1.

FIG. 7 shows another embodiment of the internal organization of the main memory used in a data processing system according to the invention. Here the fields of the exchange request 80, including bank-select bits, indicate that the read and write operations of the request are directed to two different memory banks 150 and 160 within the same memory module 140.

Operationally, the address fields 84, 86 and 88 of the exchange request 80 are loaded into a memory address register 142 from the system bus 24. A multiplexer 164 selects the appropriate row address bits from the index field 84 when enabled by the timing and control unit 148 over a line 165. The row address is loaded into a row latch 144 when the RAS signal is asserted over line 156. Multiplexer 164 then selects the appropriate column address bits when enabled over line 165. The column address is loaded into column latch 146 when the CAS signal is asserted over line 158.

In this embodiment, however, the decoded row address is applied to both memory banks 150 and 160 at the same time. If the information requested by CPU 22 is stored in memory bank 150, the column address bits loaded into the column latch 146 activate the appropriate memory elements when enabled by the WE signal provided by the timing and control unit 148 over line 162. The requested information is then loaded from the memory devices into an output register 154 for transfer to system bus 24. The CAS signal is then deasserted.

The dirty block of information is then stored in memory bank 160. The multiplexer 164 selects the appropriate column address bits when enabled by the timing and control unit 148 over line 165. The WE signal is asserted over line 162 to indicate a write access and the column address is immediately loaded into column latch 146 when the CAS signal is asserted over line 158. The information stored in input register 152 is transferred to the memory elements for storage in bank 160.

The overlapped row addressing scheme used in the circuit of FIG. 7 also reduces the amount of time that the main memory 28 needs to execute the read and write operations of the exchange request 80 since the previously mentioned time constraints are eliminated.

It will be apparent to those skilled in the art that other main memory arrangements may be used in accordance with the inventive concepts enunciated herein. For example, the fields of the exchange request, including board-select bits, may indicate that two separate memory modules are involved in the block exchange. That is to say, the corresponding memory address of the dirty cache block may be on one module and the block of information requested by the CPU may be located on another module. For this embodiment, the fetching and storing of information can be executed completely in parallel by the main memory, in a manner similar to conventional interleaving.

The interaction of signals associated with the cache memory exchange protocol, as well as their relationship to the internal operation of main memory as involved in the arrangements of FIGS. 6 and 7, is illustrated in the timing diagram of FIG. 8. A command and address transfer (C/A 802) initiated by the cache controller 36 over system bus 24 is immediately followed by the dirty cache block of information (WD0 804 and WD1 806) to be stored in main memory 28. Because of the access time of the memory, there is no further activity on system bus 24 for a predetermined period of time. Then, the requested block of information (RD0 808 and RD1 812) is transferred from the main memory 28 over system bus 24.

Meanwhile within the main memory 28, the row address (RA 822) contained in the C/A 802 is loaded into the row latch when the RAS signal on line 834 is asserted at 836. The column address for the desired block (RD CA0 824 and RD CA1 826) is loaded into the column latch when the CAS signal on line 838 is asserted at 840. The RAS and CAS signals remain asserted until the desired information is retrieved from the memory elements and loaded into the output register. At that time, the CAS signal is deasserted at 842. During the read operation, the WE signal on line 850 maintains a deasserted level.

Without changing the row address and asserted RAS signal, the column address for the dirty cache block (WR CA0 828 and WR CA1 832) is loaded into the column latch when the CAS signal is asserted at 844. The WE signal at 852 is also asserted at that time, indicating a write operation. The dirty cache block is then transferred from an input register in main memory 28 to the appropriate memory elements and the RAS, CAS and WE signals are all deasserted.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. In a data processing system including a main memory coupled to a cache memory by a bus, said main memory having a plurality of storage locations, a method of exchanging a first block of information in said cache memory with a second block of information in said main memory, said method comprising the steps of:

issuing a single memory access request from a controller of said cache memory over said bus to said main memory, said memory access request including a command field, an index field, a first tag field and a second tag field;

decoding said command field at said main memory to identify said single memory access request as comprising a fetch operation and a store operation, and, in response to said decoded command field:

fetching said second block of information from a second storage location of said main memory as said first block of information is transferred from said cache memory over said bus to a temporary register in said main memory;

transferring said fetched second block of information from said main memory over said bus to said cache memory; and storing said first block of information in said temporary register at a first storage location in said main memory, whereby said first and second blocks of information are exchanged in accordance with said single memory access request to thereby reduce the access time for obtaining said second block of information while increasing the throughout of said data processing system.

2. The method of claim 1 wherein the steps of storing comprises the step of identifying said first storage location using said index field and said first tag field.

3. The method of claim 2 wherein the step of transferring comprises the step of using said index field and said second tag field to identify a location for storing said fetched second block of information in said cache memory.

4. In a data processing system having a main memory coupled to a cache memory by a system bus, said cache memory including a cache controller, a method of exchanging a dirty block of data in said cache memory with a requested block of data in said main memory, said method comprising the steps of:

issuing a single bus request from said controller to said main memory over said system bus, said bus request including a command field, an index field, a first tag field and a second tag field;

decoding said command field and, in response to said decoded command field, reading said requested block of data from said main memory at a location identified by said index field and said second tag field;

during said step of reading, transferring said dirty block of data from a location in said cache memory identified by said index field and said first tag field over said bus to a temporary register in said main memory;

upon completion of said step of reading, transferring said requested block of data from said main memory over said bus to said cache memory and storing said requested block of data in said cache memory at a location identified by said index field and said second tag field; and writing said dirty block of data from said temporary register to a location identified by said index field and said first tag field within said main memory, whereby the bandwidth of said system bus is increased by use of a single bus request, instead of two separate bus requests, for reading and writing blocks of data in the main memory.

5. Apparatus for exchanging a dirty block of data in a cache memory with a requested block of data in a main memory, said apparatus comprising:

means for issuing an exchange request from said cache memory to said main memory, said exchange request including:

(i) a command field containing bits that identify the exchange request as comprising a read operation to fetch said requested block of data and a write operation to store a dirty block of data;

(ii) an index field containing address bits corresponding to a row address location in said main memory;

(iii) a first tag field containing address bits corresponding to a location in said main memory where said dirty block of data is to be stored; and (iv) a second tag field containing address bits corresponding to a location in said main memory where said requested block of data is to be fetched;

means, within said main memory, for decoding said command field;

means, responsive to said decoding means, for fetching said requested block of data within said main memory at said location identified by said index field and said second tag field;

means, responsive to said decoding means, for receiving said dirty block of data from a location in said cache memory identified by said index field and said first tag field while said requested block of data is being fetched;

means, responsive to said decoding means, for transferring said fetched block of data from said main memory to said cache memory at a location identified by said index field and said second tag field; and means, responsive to said decoding means, for storing said dirty block of data residing in said temporary register at a location in said main memory identified by said index field and said first tag field.

6. The apparatus of claim 5 wherein said fetching means includes:

means for loading said address bits of said index field corresponding to said row address into a row address register; and means for loading remaining address bits of said index field and said second tag field into a column address register.

7. The apparatus of claim 6 wherein said means for receiving comprises a temporary register in said main memory.

8. The apparatus of claim 7 wherein said storing means includes means for loading said remaining address bits of said index field and said first tag field into said column address register without loading said row address bits of said index field into said row address register.

* * * * *